United States Patent
Albrecht

(10) Patent No.: US 7,171,653 B2
(45) Date of Patent: Jan. 30, 2007

(54) SYSTEMS AND METHODS FOR PROVIDING COMMUNICATION BETWEEN A DEBUGGER AND A HARDWARE SIMULATOR

(75) Inventor: Gregory F. Albrecht, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 714 days.

(21) Appl. No.: 10/453,715

(22) Filed: Jun. 3, 2003

(65) Prior Publication Data

US 2004/0250244 A1   Dec. 9, 2004

(51) Int. Cl.
G06F 9/44 (2006.01)
G06F 9/45 (2006.01)

(52) U.S. Cl. .................. 717/124; 717/128; 717/129

(58) Field of Classification Search ........ 717/124–136, 717/140, 149; 709/203
See application file for complete search history.

(56) References Cited

U.S. PATENT DOCUMENTS

| | | | | |
|---|---|---|---|---|
| 5,926,642 | A * | 7/1999 | Favor ............................ 712/1 |
| 6,412,106 | B1 * | 6/2002 | Leask et al. ................. 717/124 |
| 6,496,850 | B1 * | 12/2002 | Bowman-Amuah ......... 709/203 |
| 6,584,436 | B2 * | 6/2003 | Hellestrand et al. .......... 703/13 |
| 6,691,301 | B2 * | 2/2004 | Bowen ........................ 717/114 |
| 6,708,324 | B1 * | 3/2004 | Solloway et al. ........... 717/124 |
| 6,751,583 | B1 * | 6/2004 | Clarke et al. ................. 703/17 |
| 6,766,510 | B2 * | 7/2004 | Takeda ....................... 717/127 |
| 6,795,962 | B1 * | 9/2004 | Hanson ...................... 717/129 |
| 6,901,583 | B1 * | 5/2005 | Park ........................... 717/134 |
| 7,055,135 | B2 * | 5/2006 | Kim et al. .................. 717/124 |
| 7,058,928 | B2 * | 6/2006 | Wygodny et al. ........... 717/128 |
| 7,062,753 | B1 * | 6/2006 | Ward et al. ................. 717/124 |
| 7,117,483 | B2 * | 10/2006 | Dorr et al. .................. 717/124 |
| 7,127,701 | B2 * | 10/2006 | Fables et al. ............... 717/104 |

OTHER PUBLICATIONS

Hutchings et al, Developing and debugging FPGA applications in hardware with JHDL', IEEE, pp. 554-558 1999.*
Levis et al, "TOSSIM: Accurate and scalable simulation of entire TiyOS applications", ACM SemSys, pp. 126-137, 2003.*
Albertsson et al, "Using complete system simulation for temporal debugging of general purpose operating system and workloads", IEEE, pp. 191-198, 2000.*
Wen et al, "S'DB A noel simulation based debugger for sensor network applications", ACM EMSOFT, pp. 102-111, 2006.*

* cited by examiner

Primary Examiner—Anil Khatri

(57) ABSTRACT

A system for providing communication between a debugger and a hardware simulator comprises a gateway providing a communication path between a hardware simulation and a separate debugger, the gateway comprising a bi-directional communication path out of the debugger into the hardware simulation, via uni-directional paths and communication paths out of the hardware simulation into the debugger, via a bi-directional path.

34 Claims, 2 Drawing Sheets

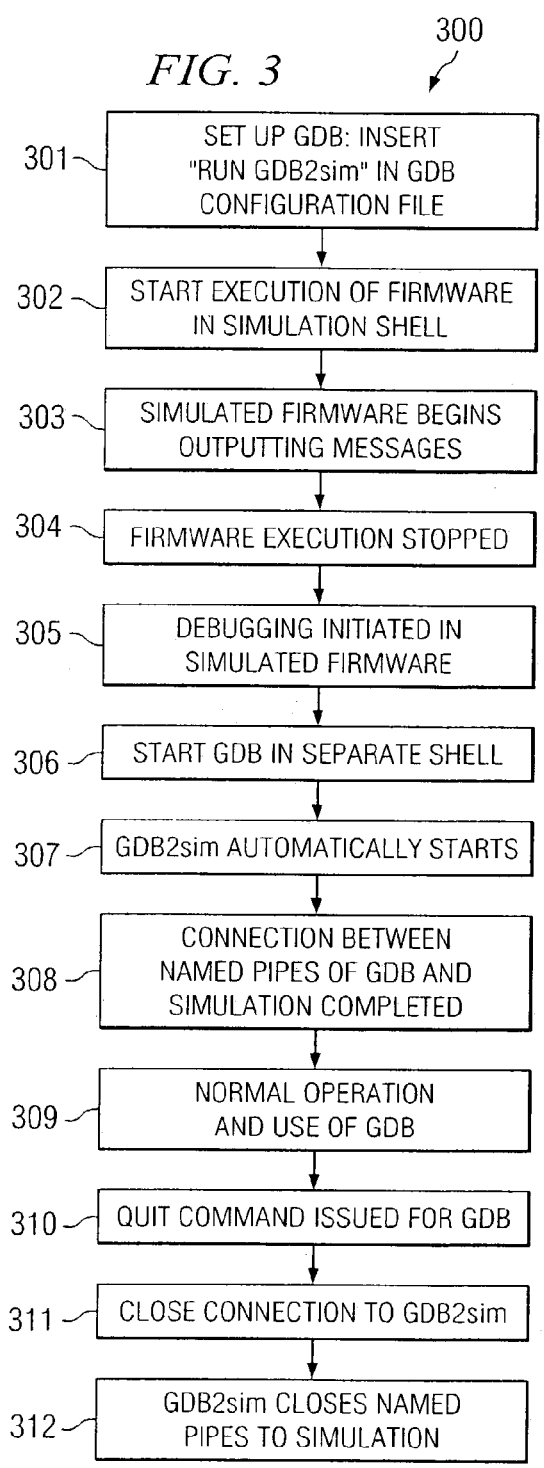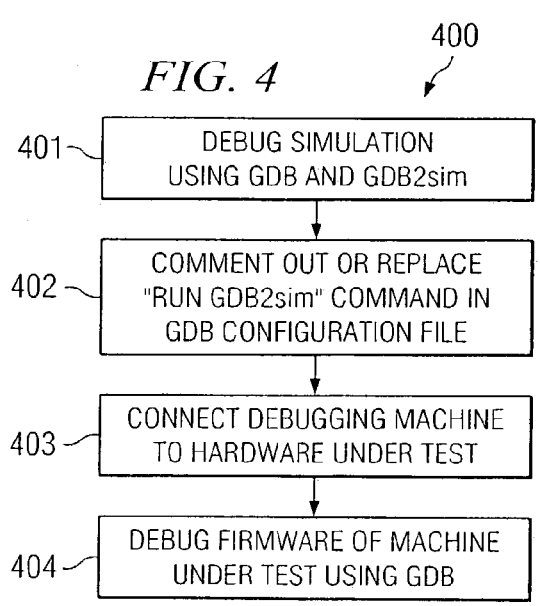

SYSTEMS AND METHODS FOR PROVIDING COMMUNICATION BETWEEN A DEBUGGER AND A HARDWARE SIMULATOR

FIELD OF THE INVENTION

The present invention is related to code debugging and specifically to systems and methods for providing communication between a debugger and a hardware simulator.

DESCRIPTION OF RELATED ART

When developing firmware for hardware that is still being designed, a simulator for that hardware may be developed so that the process of writing and debugging the firmware for that hardware can begin on this simulator, rather than waiting for the actual hardware to be built. Also, when actual hardware becomes available, there are a multitude of variables that should be addressed during firmware testing, such as hardware power-up and instruction execution. Therefore, it is helpful to have code that developers can be reasonably confident in when they start working with the new hardware.

An example of the difficulties involved in debugging firmware is illustrated by debugging a firmware debugger stub. A firmware debugger stub typically employs at least one interrupt handler. Problematically, interrupt handlers are complicated pieces of code because they must completely and accurately save the active/running context of the machine under test when a debug interrupt occurs. When the system is restarted, the debugger stub must restore the entire context of the processor that was in effect at the time the interrupt occurred. This level of an interrupt handler is typically written in assembly language and accesses low-level, processor-specific registers. The steps required to save and/or restore the state of the machine must oftentimes be carried out in a very specific order and with strict timing constraints. Frequently, if even a single bit is not restored properly, the machine under test will become unstable and crash. Problems in interrupt handlers are not easy to find and may not surface until a later point in time in a qualification run. Therefore, it is difficult to find the original source of a problem and thus interrupt related problems can not be easily recreated. Using a simulator, a developer can single-step through an interrupt handler, stopping at every instruction and easily viewing how each instruction changes various registers and the state of the machine. Therefore, a simulator provides a helpful environment in which to debug complex code such as interrupt related firmware code.

A simulator's debug capability typically operates at the assembly language or machine language level, looking at low level registers. Embedded firmware is typically much easier to debug in a higher level programming language such as a C programming language, since developers typically write firmware code using such a higher level language, before compiling. However, embedded firmware has traditionally been debugged in assembly language as supported by a simulator. This assembly language level debugging typically employs inspection of low level registers and a detailed understanding the computer implementing the firmware.

One existing method for debugging firmware is to use one type of debugger in conjunction with a hardware simulation, before hardware is available. Then when hardware arrives, the firmware debug environment is typically changed, because debugging under a simulator typically relies on debugging capabilities built into a simulator that do not exist in real hardware. Resultantly, debugging on hardware may revert to use of one or more prior art methods or systems discussed below such as debug print statements, use of an In Target Probe (ITP), and/or use of a processor bus analyzer.

A common debug tool used in an early firmware environment including simulators and in machines under test are print statements. When a firmware code problem is isolated down to a certain area of the firmware code, a print statement inserted into the source code may be used to print out variables at a point of interest in the code. Once a print statement is inserted into the code, the code must be recompiled, the firmware rebuilt and the firmware loaded onto the machine. Then the next time the firmware runs an output is provided listing variables at a point in time in execution of the firmware code. Disadvantageously, debug print statements must be inserted in specific areas of code to be useful. It is time consuming to insert the print statements into the code and to rebuild and re-burn firmware ROMs to obtain the debug output. Another disadvantage of using print statements for debugging is that print statements slow down execution of the firmware and may cause the firmware code to behave differently because of the extra prints that are being output. Sometimes the inclusion of debug print statements can change the timing enough to change the nature of a code problem or move a code problem to another area of code.

As mentioned above, a piece of equipment that may be used for firmware debugging is an ITP. An ITP is physically connected to the hardware. ITPs employ assembly language to carry out very low level debugging. Problematically, ITPs are expensive debugging tools. This typically limits the number of ITPs that can be available for a team of firmware engineers. Also, ITP units require a certain amount of set-up including connecting the ITP to the hardware to be tested, setting up LAN connections, and running related cabling. It is physically difficult to run cabling from an ITP to where a processor plugs onto a board, particularly in multiprocessor equipment where motherboards may be disposed in close proximity to each other. So it is difficult to set up an ITP in such situations as there is a potential for breaking pins on the motherboard. Also, disconnecting an ITP and moving it to another system or cell in a multi-nodal system is time consuming and can be expensive if parts are broken.

As mentioned above bus analyzers may also be used for firmware debugging. However, bus analyzers are also expensive pieces of equipment. They also require significant setup, configuration, tuning, and training in order to produce and interpret bus activity information. In addition, due to the parallelism and complex instruction and data pre-fetching capabilities of today's processors, bus activity does not always correlate well to actual firmware execution. Typically, this lessens the value of bus analyzers as firmware debug tools.

BRIEF SUMMARY OF THE INVENTION

An embodiment of a system for providing communication between a debugger and a hardware simulator comprises a gateway providing a communication path between a hardware simulation and a separate debugger. The gateway comprises a bi-directional communication path out of the debugger into the hardware simulation, via uni-directional paths and communication paths out of the hardware simulation into the debugger, via a bi-directional path.

An embodiment of a method for debugging a firmware simulation comprises executing a firmware simulation and invoking a debugger, the debugger invoking a gateway process. The gateway process comprises routing communications out of the debugger on a bi-directional pipe into the firmware simulation, via a uni-directional pipe, and routing communications out of the firmware simulation on a uni-directional pipe into the debugger, via a bi-directional pipe.

An embodiment of a method for debugging firmware comprises executing a simulation of the firmware, invoking a separate debugger, invoking, by the separate debugger, a simulation gateway process providing a communication path between the simulation and the separate debugger, correcting errors in code of the firmware, closing the simulation and the debugger, connecting, via a communications link, a subject processor device comprising the firmware to a separate processor device, and further debugging the firmware on the subject processor device using the separate processor device.

An embodiment of a computer program product comprises a computer usable medium having computer readable program code means embodied therein for causing a computer to debug a firmware simulation. The computer readable program code means comprises computer readable program code means for causing a computer to execute a firmware simulation, computer readable program code means for causing a computer to invoke a debugger, and computer readable program code means for causing the debugger to invoke a gateway, the gateway routing communications out of the debugger on a bi-directional pipe into the firmware simulation, via a unidirectional pipe, and routing communications out of the firmware simulation on a unidirectional pipe into the debugger, via a bi-directional pipe.

BRIEF DESCRIPTION OF THE DRAWINGS

FIG. 3 is a flow chart of debugging operations in accordance with embodiments of the present invention; and FIG. 4 is a flowchart of completion of debugging firmware on a machine under test in accordance with embodiments of the present invention.

DETAILED DESCRIPTION

Figure 1:
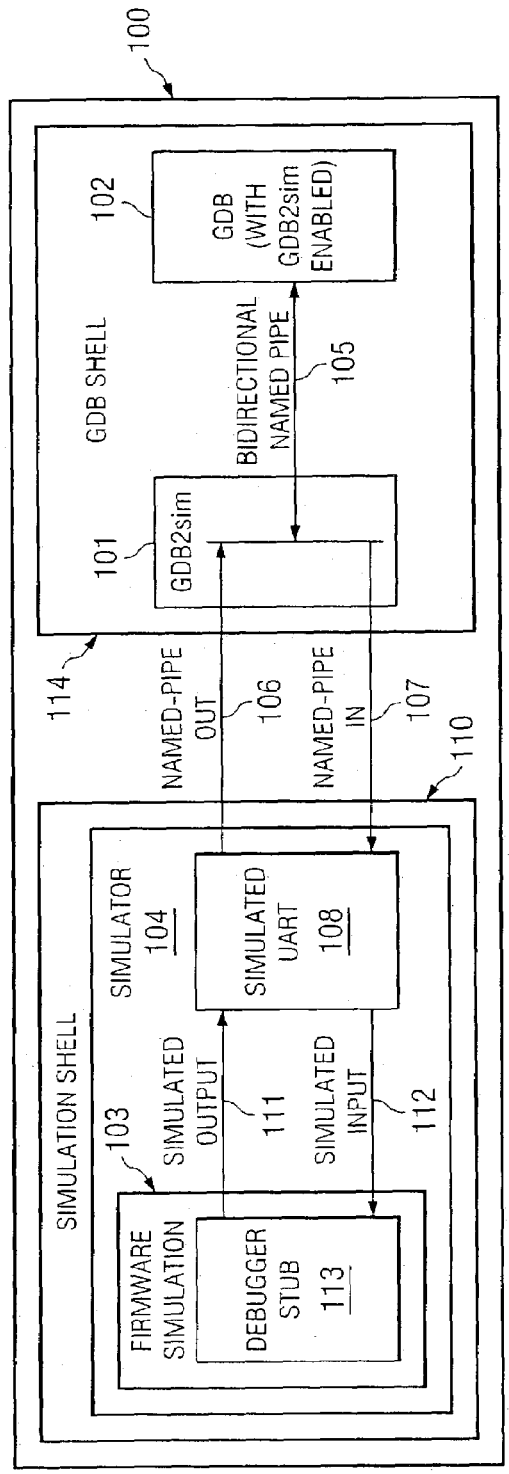
FIG. 1 is a diagrammatic illustration of a simulator and debugger communicating via an embodiment of the present invention.

Since firmware code and software is typically written in a higher level programming language such as a C programming language, it is desirable to debug firmware or software in the same high level language. An industry standard debugging program such as GDB (GNU Debug), typically debugs in a C programming language, or the like. Debugging with a higher programming language level is much more efficient and reduces time to market while providing a high quality product. As noted above, simulators provide a developer-friendly environment in which to debug complex code, such as firmware code. However, simulators and industry standard debugging programs, such as GDB, typically do not communicate with each other. Further, it is desirable to debug firmware running on a simulator in a manner similar to that used with debugging firmware on actual hardware, thereby reducing variables associated with preparing new hardware for market. Therefore, it is desirable to retain debugging mechanisms when hardware becomes available to test.

Therefore, in accordance with embodiments of the present invention, a gateway may be disposed between an industry standard debugger, such as GDB, and a simulation running subject firmware code. This facilitates debugging firmware code using an industry standard debugger which may have desirable features such as an ability to debug in a higher level language, such as a C programming language. Use of such a gateway facilitates debugging of firmware early, before the hardware that will use the firmware is available.

According to embodiments of the present invention, a program or similar functionality, often referred to herein as "GDB2sim", enables use of an industry standard debugging program, such as GDB, to debug firmware using a C programming language, or the like. The GDB2sim program enables communication between GDB and a simulator to enable debugging of firmware early, using a C programming language, before the hardware that will use the firmware is available for testing.

Also it is desirable to debug using the same methodology early, when debugging under a simulator, as will be used when debugging firmware in actual hardware later on. Once hardware is available, a platform running a debugger can be connected directly to the test hardware because industry standard debuggers, such as GDB, typically support debugging via a serial port or the like. Embodiments of the present invention facilitate initial debugging of firmware in a higher programming language, such as a C programming language, thereby enabling debugging the same way on an early simulator as will be used on the actual hardware when it is available. According to embodiments of the present invention, the use of a gateway as provided herein enables the same high-level language debugging capabilities to be utilized with the hardware simulator as will be used with real hardware after it arrives. The firmware developer need not resort to an initial low level, machine-language debugging environment. With a one-line change to a configuration file, as described below, the debugging capability is easily switched from debugging a simulator target to debugging on actual hardware.

Although print statements may continue to be used in conjunction with debugging in a C programming language environment, embodiments of the present invention enables faster firmware debugging, since the developer need not modify code and rebuild or re-burn ROMs until final testing. Also, use of embodiments of the present systems and methods alleviates the need for expensive test equipment such as bus analyzers and In Target Probes (ITPs). Thus, in accordance with embodiments of the present invention, inexpensive legacy workstations with serial ports are typically sufficient for debugging host systems.

Turning to FIG. 1, a diagrammatic illustration of system 100 comprising debugger 102 and simulator 104 communicating via an embodiment of the present invention is shown. System 100 may take the form of a single general purpose processor device running separate processes or shells, 114 and 110, for debugger 102 and simulator 104, respectively, or separate interconnected general purpose processor devices. In accordance with embodiments of the present invention, gateway 101 that provides a communication path between industry-standard debugger 102, such as GDB, and firmware simulation 103, executing on a hardware simulator 104 may take the form of a GDB2sim software program as illustrated. However, gateway 101 might take other forms such as a hardware device.

Both debugger 102 and simulator 104 of an embodiment of the present invention each provide Unix InterProcess Communication (IPC) mechanism such as the illustrated "named-pipes" interface, but these named pipes are incompatible communication mechanisms. Named pipes may be used for IPC where there is a process, task or program at each end of the pipe. As illustrated in FIG. 1, debugger 102 is designed to communicate with single bi-directional pipe 105, but simulator 104 provides two uni-directional pipes 106 and 107.

GDB2sim may be used to act as a gateway between the two dissimilar communications protocols such as the illustrated named-pipe capabilities. In a debug environment, debugger 102 may be configured to communicate over a serial port. Simulator 104 may emulate a serial port or a Universal Asynchronous Receiver/Transmitter (UART) 108 using simulated serial output 111 and simulated serial input 112. Inserting GDB2sim gateway 101 between debugger 102 and simulator 104, enables GDB2sim gateway 101 to route debugger output via bi-directional named pipe 105 to the simulator input pipe 107, and routes simulator output via named pipe 106 to debugger input/output (I/O) pipe 105. Input and output named-pipes 106 and 107 communicate with a process, such as illustrated simulated UART 108. That process is typically a part of the simulator. Simulated UART 108 may then connect to debugger stub 113. This enables both GDB debugger 102 and hardware simulator 104 to run unmodified.

Figure 2:
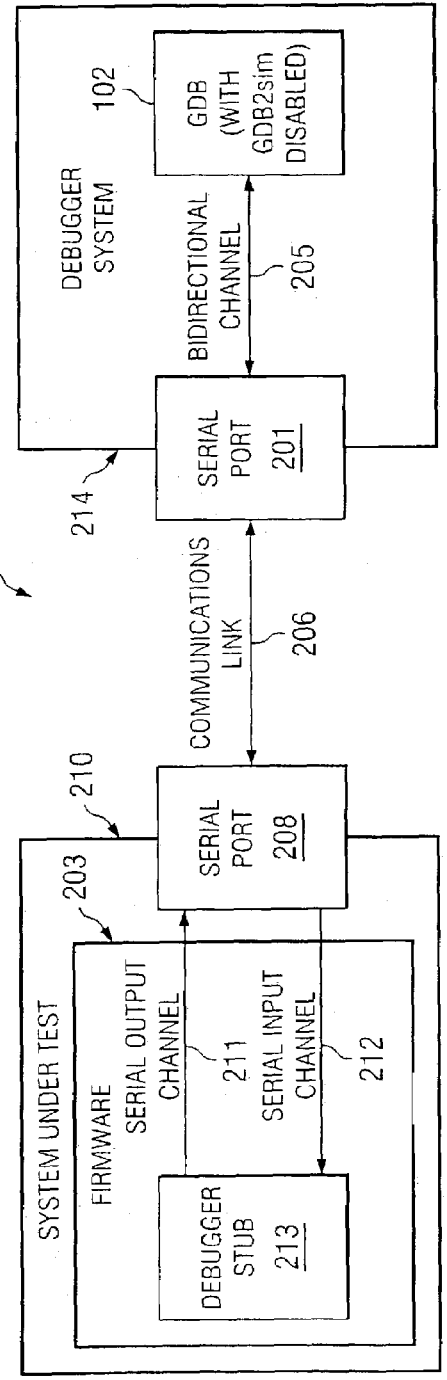
FIG. 2 is a diagrammatic illustration of a system under test communicating with a debugger platform via serial ports and a serial connection for further debugging in accordance with embodiments of the present invention.

When actual hardware intended to employ the firmware becomes available the firmware may be further debugged using a configuration such as illustrated in FIG. 2. FIG. 2 is a diagrammatic illustration of configuration 200 of system 210 under test communicating with debugger platform 214 via serial ports, 208 and 201 respectively, or the like, and communication link 206, such as a serial cable. System 210 is actual hardware to be tested. In configuration 200, gateway 101 is not used and may be disabled, debugger 102 may communicate via bi-directional channel 205 with physical serial port 201 on debugger platform 214. To this end, a debugger such as GDB may employ a Unix open file descriptor to the device file for the serial device. Communications link serial cable 206, from debugger platform 214 connects to system under test 210 and is utilized by firmware debugger stub 213 of actual firmware 203 using output channel 211 and input channel 212 to communicate via serial port 208, typically using functionality such as a physical UART chip or the like.

In the simulation environment of FIG. 1, gateway 101 (GDB2sim) may be automatically started by a debugger client (GDB) using a "target remote" command, or the like, in a debugger configuration file (.gdbinit). In the hardware debug environment of FIG. 2, the "target remote" line may be modified to point to a serial device such as serial port 201 on debugger host platform 214. Regardless, debugger 102 operates similarly in FIG. 1 and FIG. 2. In FIG. 1 debugger 102 opens a named-pipe to gateway 101 and in FIG. 2 debugger 102 opens a file with the name of the serial port, such as "dev/serial1".

Also, debugger stub 113 and 213 run similarly in the environment of FIG. 1 and the environment of FIG. 2. Debugger stubs 113 and 213 read characters from a UART and write characters to the UART. In FIG. 2, the UART is a physical UART associated with serial port 208 and the characters travel through serial cable 206 or the like to debugger system 214. In FIG. 1, debugger stub 113 writes characters to simulated UART 108 and the simulator moves the characters via named-pipe out 106 to gateway 101 and characters coming from debugger 102 via gateway 101 are moved into simulated UART 108 via named-pipe in 107. Thus, when debugger stub 113 tries to read characters from the UART/serial port, it receives characters simulator 104 has received over the named-pipe in 107 from gateway 101.

By inserting gateway 101 between debugger 102 and simulator 104, firmware developers are able to utilize an industry standard debugger, for example GDB, to debug firmware 104 on hardware simulator 104 using the same debugging environment and debug tools as they will use when debugging actual firmware 203 running on hardware under test 210. In addition, built-in firmware debugger stub 213 that provides GDB "remote target" support preferably works the same on hardware 210 as debugger stub 113 does in simulator 104. This enables development, testing and debugging of complex firmware code in a feature-rich simulation environment and reduces the chances of needing to "debug the debugger" when hardware arrives. For example, as discussed above, part of the firmware debugger stub is an interrupt handler. Also as discussed above, interrupt handlers are complex anddifficult to debug or otherwise manipulate. In accordance with various embodiments of the present invention, simulator 104 can be used by a developer to single-step through firmware interrupt handler code, stopping at every instruction and easily viewing how each instruction changes various registers and the state of the machine, prior to testing firmware 203 on an actual machine under test 210. Although such simulation testing does not rule out bugs in actual firmware 203, simulator 104 is a helpful environment in which to debug such complex firmware code.

In accordance with embodiments of the present invention, a single general purpose processor device acting as system 100, running debugger 102 in debugger process or shell 114, and running simulator 104 in simulation process or shell 110 may also be used as system 214, used to run debugger 102 when testing actual firmware 203. However, different general purpose processor devices may be used as system 100 and 214. Generally, a relatively great amount of computing power is needed to run real-time simulations of firmware for modern multi-nodal computer systems, or the like. However, during debugging of actual firmware speed of execution is less of an issue as the computer hosting the debugger client, such as GDB, requires relatively little CPU usage. According to embodiments of the present invention, the debugger may run at different speeds at the two different stages of debugging.

FIG. 3 is a flow chart showing operation 300 of an embodiment of the present invention. An industry standard debugger, such as GDB or the like, is set up at 301. A debugger configuration file, or the like, may include a command-line that tells the debugger to automatically start the present gateway program, for example "GDB2sim".

Simulated execution of the firmware code to be tested is started at 302 in a simulation window or shell. When the simulated firmware begins outputting messages, at 303, in a console window, indicating that it is active, the firmware is stopped at an interactive developer user interface prompt at 304 by inserted breakpoints or by an interrupt keystroke from the operator. At 305, a command is entered at the interactive prompt to initiate internal debugging in the firmware simulation.

In another shell, which may run on the same platform, preferably in the same directory where the simulator was started, an industry standard debugger, such as GDB, is executed at 306. When a user starts the debugger, the gateway function automatically starts at 307 in accordance with the setup of step 301. When the debugger starts, it begins sending and receiving communications on the named-pipes that are connected to a simulator, running in the other shell, via the gateway. This completes a connection between a simulator's simulated UART named-pipes, and the debugger's I/O named-pipe through GDB2sim at 308. To facilitate locating and connecting the named-pipes, the named pipes for the simulator's UART emulation are preferably created in the same directory as the directory in which the debugger was started, and where the gateway was started.

The debugger begins communicating as if communicating to hardware via a serial port using the named-pipes, through the gateway, to the simulator. At 309 debugger begins its normal operation, begins sending debugging commands inquiring as to the firmware program counter level inspecting registers, inquiring as to the machine state, and the like. The debugger displays this information to the user showing what line of code at which the program is halted, which initially should be the line where the user inserted the GDB command, or the like, after interrupting the firmware. At the debugger prompt, the user may set a breakpoint anywhere they want in the firmware, depending on what problem they are attempting to debug. From this point, 309, a general debugging session begins. The user can single step through the firmware or set a breakpoint in any routine they wish to debug. Thereafter, the user may use GDB commands to continue or reinitiate execution of the firmware. Preferably, when the firmware halts at the breakpoint the user may use standard debugging commands to look at which line of program code the firmware is halted, and look at what variables are active. Additionally, a debugger such as GDB enables the user to change variables to some other state to help simulate other behaviors.

At 310, a quit command may be used to close down named-pipes. This also closes the connection to the gateway (GDB2sim) at 311 and the gateway closes its named pipe connection back to the simulator at 312. Typically, the simulator will stay active, but the debugger connection is closed and to reestablish the connection the debugger may be started again, such as at box 306.

Turning to FIG. 4, completion 400 of debugging of firmware on a subject machine under test, actual hardware according to an embodiment of the present invention, is flowcharted. Sometime after completion of debugging of simulated firmware at 401, in accordance with steps 301 through 312 of FIG. 3, a debugger such as GDB is run in a conventional manner to debug the actual firmware. The configuration file line inserted at 301 above is commented out and/or a line may be inserted, or made active, giving the name of an actual serial port that the debugging platform is connected at 402. A serial cable from that serial port to the target firmware machine that is being debugged is attached at 403 to provide communication between the debugging computer and the unit under test. Debugging operation proceeds in a conventional manner, as known to those having ordinary skill in the art, at 404. Thus, one configuration file switch enables a user to switch between simulator debugging and hardware debugging without changing the environment in which they debug.

What is claimed is:

1. A system for providing communication between a debugger and a hardware simulation, said system comprising a gateway providing a communication path between said hardware simulation and said debugger, said gateway comprising a bi-directional communication path between said debugger and said gateway, and uni-directional communication paths between said hardware simulation and said gateway.

2. The system of claim 1 wherein said bi-directional communication path is a bi-directional named-pipe.

3. The system of claim 2 wherein communications out of said debugger on said bi-directional named-pipe are routed into said hardware simulation via one of said uni-directional communication paths.

4. The system of claim 1 wherein communications out of said hardware simulation are on a uni-directional named-pipe.

5. The system of claim 4 wherein communications out of said hardware simulation on said uni-directional named-pipe are routed out of said hardware simulation into said debugger, via a bi-directional named-pipe.

6. The system of claim 1 wherein said hardware simulation emulates a serial port.

7. The system of claim 6 wherein said uni-directional communication paths into and out of said simulator hardware are named-pipes of said emulated serial port.

8. The system of claim 1 wherein said debugger, said simulation and said gateway execute on at least one processor.

9. The system of claim 8 wherein said execution of said gateway is a part of said execution of said debugger.

10. A method for debugging a firmware simulation, said method comprising:
executing a firmware simulation; and
invoking a debugger, said debugger invoking a gateway process comprising:
routing communications out of said debugger on a bi-directional pipe into said firmware simulation via a first uni-directional pipe; and
routing communications out of said firmware simulation on a second uni-directional pipe into said debugger via the bi-directional pipe.

11. The method of claim 10 wherein said firmware simulation is executing, and said debugger is invoked, on a same processor.

12. The method of claim 10 wherein said firmware simulation is executing on a first processor and said debugger is invoked on a second processor.

13. The method of claim 10 wherein said routing communications into and out of said simulation comprises emulating a serial port.

14. The method of claim 10 wherein said uni-directional pipes into and out of said simulator hardware are named-pipes.

15. The method of claim 10 further comprising
breaking operation of said firmware.

16. The method of claim 10 further comprising:
initiating a debugger within said simulation.

17. A method for debugging firmware, said method comprising:
executing a simulation of said firmware;
invoking a separate debugger;
invoking, by said separate debugger, a simulation gateway process providing a communication path between said simulation and said separate debugger
correcting errors in code of said firmware;
closing said simulation and said debugger;
connecting, via a communications link, a subject processor device comprising said firmware to a separate processor device; and
further debugging said firmware on said subject processor device using said separate processor device.

18. The method of claim 17 wherein said simulation gateway process comprises:

routing communications out of said separate debugger on a bi-directional pipe into said simulation via a first uni-directional pipe; and routing communications out of said simulation on a second uni-directional pipe into said separate debugger via the bi-directional pipe.

19. The method of claim 17 wherein said simulation is executed on a processor as a first process and said separate debugger is invoked on said processor as a second process.

20. The method of claim 17 wherein said simulation is executed on a first processor and said separate debugger is invoked on a second processor.

21. The method of claim 17 wherein said first process and said second process are executing on a same processor.

22. The method of claim 17 further comprising:
breaking operation of said simulated firmware.

23. The method of claim 17 further comprising:
initiating a debugger within said simulation.

24. The method of claim 17 wherein said further debugging comprises:
beginning operation of said firmware of said subject processor device;
breaking operation of said firmware of said subject processor device;
initiating a debugger on said separate processor device; and
correcting errors in code of said firmware.

25. The method of claim 24 further comprising communicating, by said debugger, with said subject processor device via said communications link.

26. The method of claim 24 wherein said routing communications into and out of said simulation comprises said simulation emulating a serial port.

27. The method of claim 26 wherein said uni-directional pipes into and out of said simulation are named-pipes comprising said emulated serial port.

28. A computer program product comprising:
a computer usable medium having computer readable program code means embodied therein for causing a computer to debug a firmware simulation, said computer readable program code means comprising:
computer readable program code means for causing a computer to execute a firmware simulation;
computer readable program code means for causing a computer to invoke a debugger; and
computer readable program code means for causing said debugger to invoke a gateway, said gateway routing communications out of said debugger on a bi-directional pipe into said firmware simulation via a first uni-directional pipe, and routing communications out of said firmware simulation on a second uni-directional pipe into said debugger via the bi-directional pipe.

29. The computer program product of claim 28 further comprising computer readable program code means for causing a computer to execute said firmware simulation and invoke said debugger on said computer.

30. The computer program product of claim 28 further comprising computer readable program code means for causing said firmware simulation to execute on a first processor and said debugger to be invoked on a second processor.

31. The computer program product of claim 28 further comprising computer readable program code means for causing a computer to route said communications into and out of said simulation via a serial port emulated by said simulation.

32. The computer program product of claim 28 wherein said uni-directional pipes into and out of said simulator hardware are named-pipes.

33. The computer program product of claim 28 further comprising computer readable program code means for causing a computer to break operation of said firmware.

34. The computer program product of claim 28 further comprising computer readable program code means for causing a computer to initiate a debugger within said simulation.

* * * * *